Sept. 22, 1936.  W. G. NOACK  2,055,385

PULVERIZING PLANT

Filed Aug. 3, 1934  3 Sheets-Sheet 1

Inventor
Walter Gustav Noack
per Karl A. Mayr
Attorney.

Sept. 22, 1936. W. G. NOACK 2,055,385
PULVERIZING PLANT
Filed Aug. 3, 1934 3 Sheets-Sheet 2
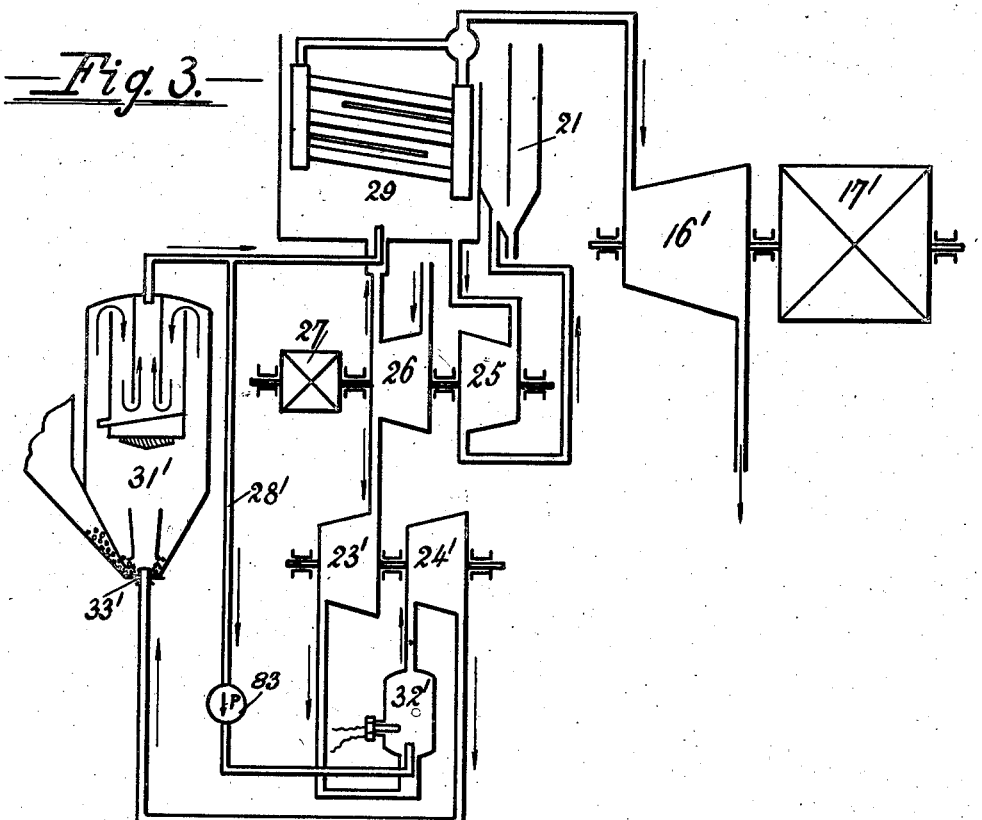
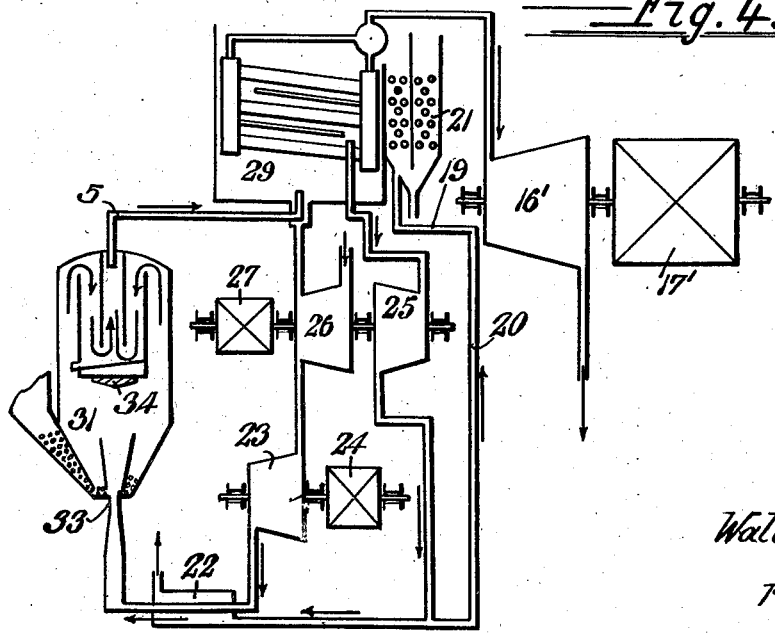
Inventor
Walter Gustav Noack
per Karl A. Mayr
Attorney

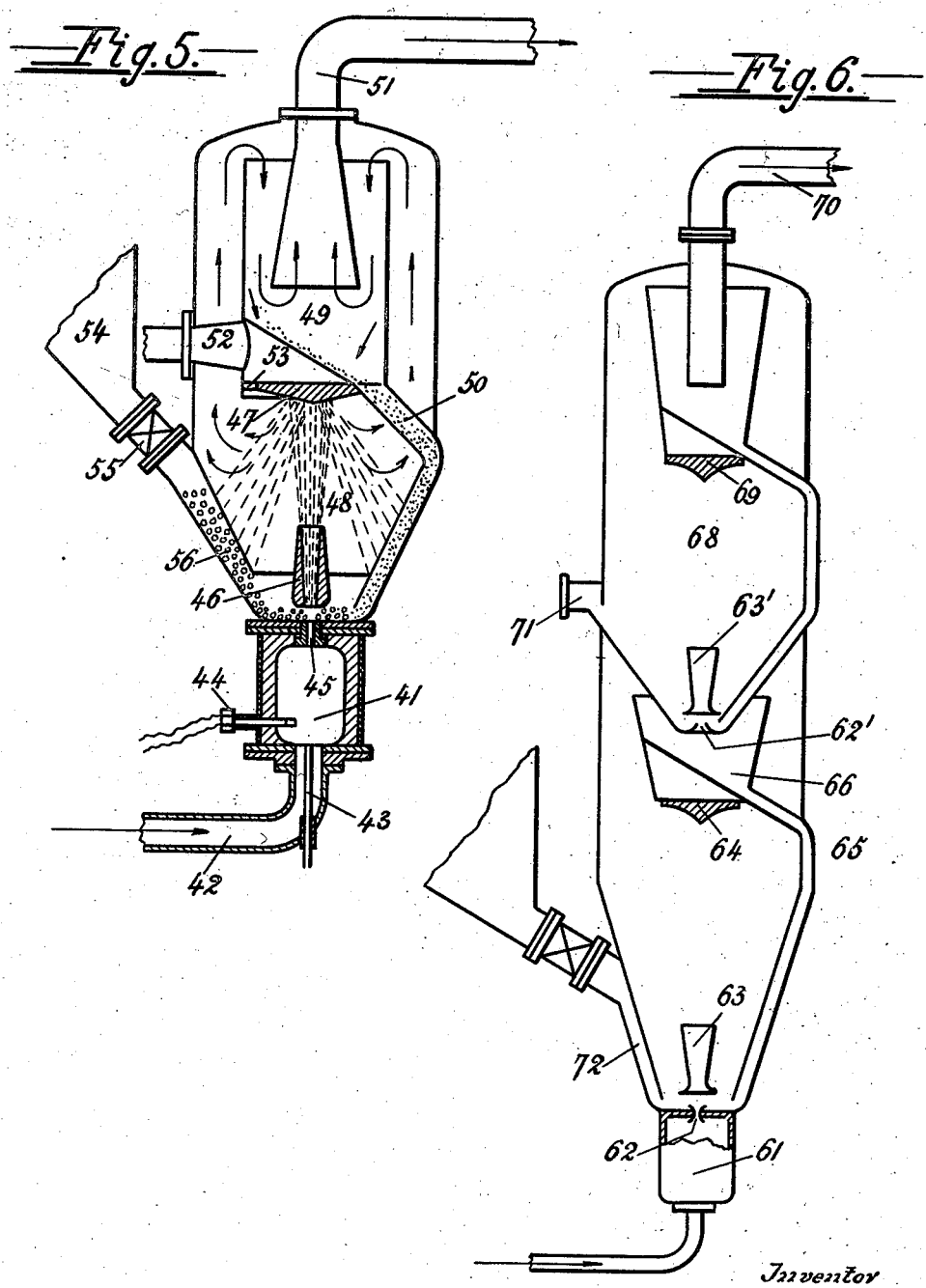

Patented Sept. 22, 1936

2,055,385

UNITED STATES PATENT OFFICE 2,055,385

PULVERIZING PLANT

Walter Gustav Noack, Baden, Switzerland, assignor to Aktiengesellschaft Brown, Boveri & Cie., Baden, Switzerland Application August 3, 1934, Serial No. 738,314
In Germany August 8, 1933

23 Claims. (Cl. 122—4)

This invention relates to pulverizing plants, more particularly to power plants comprising pulverizers which supply pulverized fuel for producing the heat required for operating the plant.

An object of the present invention resides in the provision of a pulverizing plant of the character referred to in which the energy required for the pulverizing process is reduced and all heat energy supplied to or produced in the pulverizer is immediately and without loss reintroduced into and efficiently used by the plant generating the power required for the pulverizer.

An object of the present invention resides in the provision of a pulverizing plant of the character referred to comprising all means required to produce the energy for operating the plant whereby the fineness of the substance to be pulverized can be increased to any required degree without considerably increasing the initial energy requirements of the plant.

An object of the present invention resides in the provision of a pulverizing plant of the character referred to in which the pulverizer is directly connected with a heat consumer which efficiently uses all heat generated in or available from the pulverizer.

Further and other objects of the present invention will be hereinafter set forth in the accompanying specification and claims and shown in the drawings which, by way of illustration, show what I now consider to be a preferred embodiment of my invention.

High power requirements of pulverizers for grinding coal to be used as fuel for power plants are particularly undesirable because the fineness required is high and the power necessary for producing it considerably reduces the overall efficiency of the power plant. In the conventional plants the major part of the power consumed is not used for grinding the coal but for making up losses in the auxiliaries and their drives. Aside from mechanical mills pneumatic mills are used in which the grinding work is done by air- or steam-jets which accelerate the substance to be ground to high velocities and throw it against baffle-plates, thereby crushing the substance. The power consumption of pneumatic mills is mostly greater than that of mechanical mills. Pneumatic mills, however, are simpler and live longer. The great power consumption of pneumatic mills is caused by the smaller efficiency of the crushing work and also of the compressor in case compressed air is used and the utilization of the energy of steam as compared with the efficiency at which steam turbines operate—in case steam is used in the pulverizer.

The pulverization can be made much more efficient, if the energy required is produced in such a manner that its production entails no or little heat loss in the plant for which the substance is produced.

According to the invention the energy required for the pulverizing process is directly or indirectly derived from the expansion of the products of combustion of a fuel-air mixture whereby the total or almost all of the heat content of said fuel-air mixture is used in the same plant of which the pulverizer is a part. If, for example, the pulverizer is driven by a gas turbine which is operated by all the waste heat generated in a plant using the coal pulverized in said pulverizer almost the total power requirements of the pulverizer are obtained without cost. The plant may be a steam power plant in which the boilers are fired with powdered coal and the exhaust gases of the gas turbine operating the mill are also introduced into the combustion chamber or passes of the boilers for efficient use of their heat content. The plant may also consist of a gas turbine or engine, the combustion chamber of which is fired with powdered coal produced by the same plant and the flue gases of the pulverizer be introduced into a suitable stage of the gas turbine or engine or used for heating a waste gas boiler which is integral with the plant.

In case a pneumatic mill is used operating with compressed air, this may be produced in a compressor driven by a gas turbine.

In the drawings:

Fig. 3 is a diagrammatic showing of a modification of a plant according to my invention.

Fig. 4 is a diagrammatic showing of a plant according to my invention which is like the plant illustrated in Fig. 2 of the drawings with the difference that the coal pulverizer is operated by expanding air only.

Fig. 5 is a diagrammatic cross-sectional view of a pulverizer according to my invention.

Fig. 6 is a diagrammatic cross-sectional view of a modified pulverizer according to my invention.

Figure 1:
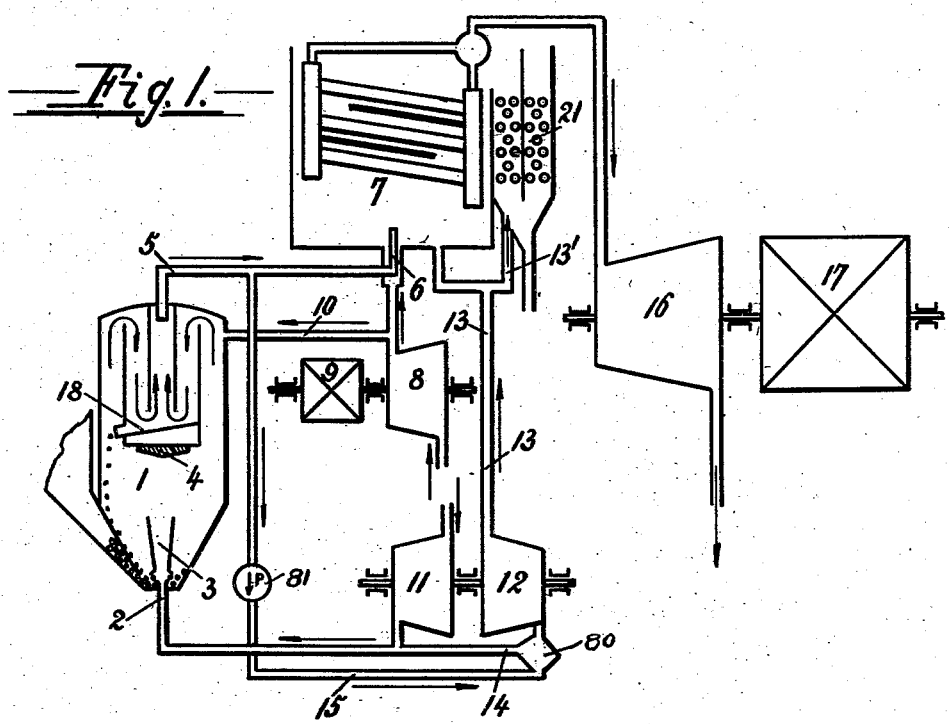
Fig. 1 is a diagrammatic showing of a plant according to my invention operating a steam boiler.
Figure 2:
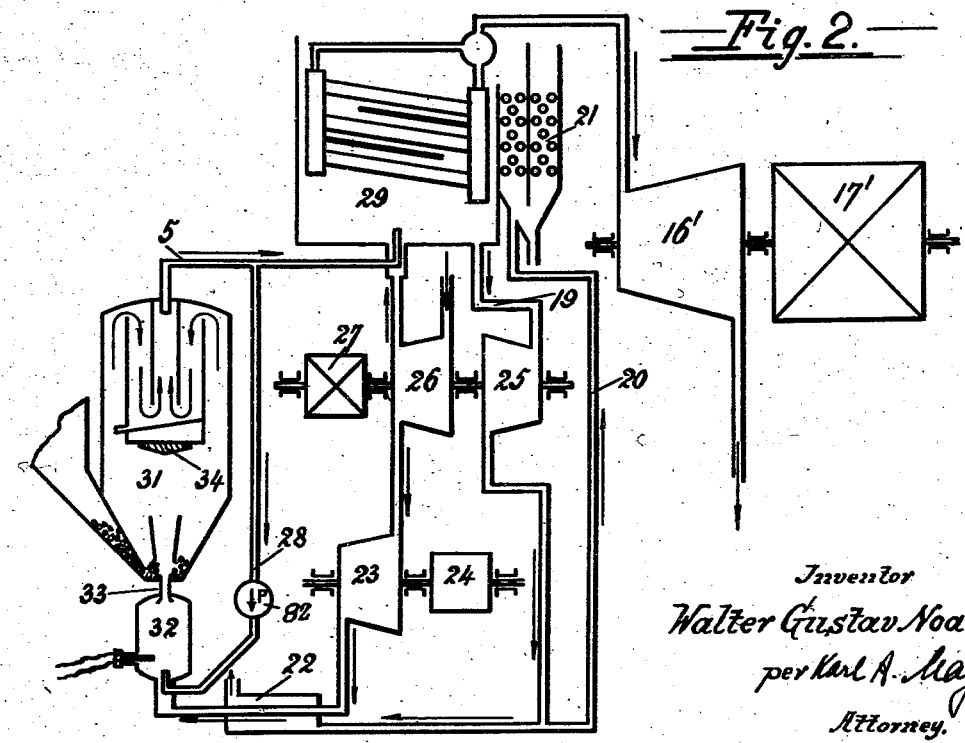
Fig. 2 is a diagrammatic showing of a modification of the plant illustrated in Fig. 1.

Referring now particularly to Fig. 1 of the drawings I designates a pneumatic mill having a nozzle 2 in which highly compressed air assumes a great velocity, seizes the coal and throws it through the nozzle 3 onto the crushing plate 4. The fine coal dust is carried by the air current in the direction of the arrows into the conduit 5 which terminates in the powdered coal burner 6 of the boiler 7. The latter is not shown in detail as a steam-boiler is not the subject matter of this invention. Particles of coal which are not small enough to be carried up to conduit 5 by the air current collect on the inclined plate 18 from which they fall back towards the nozzle 2 to be seized again by the air and thrown against the crushing plate 4. The major part of the combustion air for the steam boiler 7 is supplied by the blower 8 driven by a motor 9. Part of the air produced by blower 8 may be conducted through conduit 10 into the pulverizer 1 to act as a carrier for the coal dust. The compressed air for the pulverizer 1 is produced by the compressor 11. According to the invention, this compressor is driven by a gas turbine 12 the exhaust gases of which are conducted by conduit 13 into the combustion chamber of the boiler 7, or by a conduit 13' into a suitable pass of the boiler, for example the economizer 21. The combustion chamber 80 of gas turbine 12 through conduit 14, may be supplied with compressed combustion air from the compressor 11 and with fuel, i. e. powdered coal from pulverizer 1 through conduit 15. If the steam boiler 7 is fired under high pressure, the driving agent for the gas turbine may be taken from the combustion chamber of the boiler and conducted to the gas turbine through the conduit 19 as is shown in Fig. 2 of the drawings. The exhaust of the gas turbine 25 is conducted into the pass of the boiler, where, for example, the economizer 21 is located. A part of the heat contained in the exhaust gases of turbine 25 may be used for heating the operating air. For the latter purpose a heat exchanger 22 is provided. In the embodiment of my invention illustrated in Fig. 1, as well as in the embodiment illustrated in Fig. 2, the heat cycle of the gas turbine is coupled with the heat cycle of the boiler so that all heat which is not converted into work for grinding, the initial heat supplying medium, namely the coal, is used for generating steam. The pressure and heat energy which is converted into velocity energy in nozzle 2 goes, together with the fuel, into the boiler furnace in the form of heat. The steam generated in boiler 7 may be used for operating a turbogenerator 16—17.

When using a gas turbine for driving a mechanical pulverizer or when producing the operating medium of pneumatic mills according to my invention, the losses which are associated with the conventional systems using motor- or turbine-drive and which cannot be regained are eliminated.

The energy required for crushing in pneumatic pulverizers can be more directly obtained, if instead of pure air, compressed in a gas-turbine-driven compressor the products of combustion which are mixed with air are used. Fig. 2 diagrammatically shows such a system. 31 is a pneumatic pulverizer, the output of which is increased by supplimentary supply of an operating medium which is produced in a separate combustion chamber 32. The highly compressed combustion-air for this chamber is supplied by the compressor 23 which may be driven by a gas turbine or—inasmuch as only small power is required—by some other means, for example an electric motor 24. The powdered coal produced in pulverizer 31 is used for firing a pressure fired steam boiler 29, i. e., a boiler, in the combustion chamber of which a high gas pressure prevails. The high pressure combustion gas produced in the furnace of boiler 29 is used for operating the gas turbine 25 which drives the compressor 26 supplying combustion air under high pressure to the furnace of boiler 29. An electric motor 27 may be provided for starting up and regulating purposes. Compressor 23 which may be combined with compressor 26 is charged with air from compressor 26. The fuel for combustion chamber 32 is powdered coal taken from the discharge conduit 5 of the pulverizer and conducted into the chamber 32 by conduit 28. Liquid fuel, gas or the like, may be used instead of powdered coal. A great temperature drop is available from the gas produced in chamber 32. This drop is used for accelerating the gas in nozzle 33 and throwing the coal against crushing plate 34 in the same manner as is done by compressed air in the apparatus shown in Fig. 1. All energy contained in the combustion gases produced in chamber 32 which is not used for crushing and grinding work, goes into the boiler 29 and is used for generating the steam operating turbine 16' which drives the electric generator 17'.

The combustion chamber 32 and the fuel conduit 28 may be entirely omitted and the pulverizer operated by expanding air only, which may be heated in air heater 22. Such an arrangement is shown in Fig. 4.

Instead of producing gas under pressure in a combustion chamber associated with the pulverizer as illustrated in Fig. 2 the gases may be produced in the combustion chamber 32' of a gas turbine, for example, a gas turbine 24' which operates the air compressor 23' as shown in Fig. 3. The gases expand first in the gas turbine 24' and give up part of their heat before entering the nozzle 33' of the pulverizer 31'.

Fig. 5 is a cross-sectional view of a pneumatic pulverizer, having a combustion chamber associated therewith for producing the operating medium. 41 is the combustion chamber which is supplied with compressed air by means of conduit 42 and with fuel, for example powdered coal, through nozzle 43. Instead of powdered coal, gaseous or liquid fuel may be used. The fuel-air mixture is ignited by means of the screwed-in electric plug 44, which can be unscrewed and removed as soon as the fuel is ignited. The products of combustion represent a large available heat-drop owing to their high pressure and high temperature which is converted by the expansion in nozzle 45 into a velocity higher than sound velocity. The gas-jet emerging from nozzle 45 seizes the coal rolling down to the mouth of the nozzle, accelerates it within the secondary nozzle 46 and throws it at high velocity against the crushing plate 47. The crushed coal falls back towards nozzle 45; this action is so often repeated till the coal is sufficiently fine pulverized to be carried along by the current of the operating medium from the chamber 48 in the direction of the arrows and into the chamber 49. Larger particles separate themselves in chamber 49 and fall back to nozzle 45 by way of channel 50. The fine dust is carried through tube 51 to the point where the powdered coal is consumed. An intermediary container, not shown, may be provided between the mill and the point of consumption for storage purposes. In most cases the produced coal goes directly to the furnace to be fired with it. If the operating medium does not suffice for carrying the dust, part of the combustion air may be blown into the chamber 48 through conduit 52 and the annular slot 53. Instead of a slot a plurality of apertures may be provided. The pre-crushed coal comes from the silo 54 through a valve 55 and enters the bottom of the pulverizer through channel 56. In spite of its expansion the operating medium may still have a considerable temperature when leaving the nozzle 45. The medium, however, is cooled when mixed with the cold coal to such a low temperature that when combustion-air is added through conduit 52 and the apertures 53, no ignition, but in the contrary, rather a further cooling of the mixture of operating medium and coal dust takes place. The walls of the pulverizer and the conduits are made so strong that they resist temporary increases of pressure caused by minor detonations. When starting up some coal may be burned up so that the interior of the pulverizer and attached conduits are filled with gases poor or free of oxygen. The warming up of the coal by means of the hot operating medium expedites the drying and grinding action.

It is advantageous to design the pneumatic mill as a multistage pulverizer wherein the available pressure-drop of the stream of the operating gas is not used up in one single nozzle, but in several serially arranged stages. Fig. 6 diagrammatically shows a two-stage mill. The gas-jet produced in expansion nozzle 62 of combustion chamber 61 throws the coal located in front of the expansion nozzle 62 into the accelerating nozzle 63 where the coal assumes great velocity and therefrom onto the crushing-plate 64; the less finely divided particles return to nozzle 62 by gravity a part of these particles passes through conduit 65; the finer particles are carried by the operating medium into the chamber 66, are then thrown through expansion nozzle 62' and together with coal particles separated out in chamber 68 through a further accelerating nozzle 63' against the crushing-plate 69. The finely powdered coal is conducted out of the pulverizer through tube 70, carried by the operating medium emerging through the same tube. Additional air for transporting the powdered coal may be introduced into the apparatus through conduit 71. The raw coal is introduced into the pulverizer through conduit 72.

Particularly useful is the operation of a pneumatic mill in connection with pressure fired steam-boilers, because all conduits and chambers in such plants are inherently designed for high pressure and no additional transport- or valve-means must be provided between the pulverizer and the combustion chamber of the boiler. The pressure within the mill is somewhat higher than in the boiler furnace. The initial pressure of the operating medium is higher than the pressure required for assuring satisfactory pulverization of the coal. It is advantageous to use a piston compressor or a turboblower driven by a motor operating at constant speed for compressing the operating medium. If the compressor for the operating medium is charged by the compressor for the combustion-air for the pressure-fired boiler, the pressure of the operating medium varies in the same manner as the charging pressure for the boiler furnace, i. e., the back pressure of the expansion nozzle of the pulverizer. Therefore the pressure drop in the expansion nozzle as well as the volume of the operating medium is constant at various load-conditions of the boiler.

The elimination of exterior losses makes a larger amount of power available for the pulverization, than is available when using conventional mill drives of small efficiency. Any degree of fineness of pulverization may be obtained and combustion in the boiler furnace can be sped up and improved.

The system of coupling up of the energy required for the pulverizing process and obtained directly or indirectly from the expansion of combustion gases from a fuel-air mixture with the heat cycle of the same plant, according to the invention may also be used when dealing with other mediums instead of coal, for example cement.

While I believe the above described embodiments of my invention to be preferred embodiments.

I wish it to be understood that I do not desire to be limited to the exact details of design and construction shown and described, for obvious modifications will occur to a person skilled in the art.

What I claim is:—

1. Plant comprising a pulverizing plant, operated by a hot operating medium, consuming means adapted to consume the materials ground in said mill, conduits connecting said pulverizing plant and said consuming means and adapted to conduct the operating medium from said pulverizing plant to said consuming means after it has given up part of its heat for operating said pulverizing plant.

2. Combustion plant comprising a coal pulverizing plant and heat consuming means adapted to be heated by the coal pulverized in said pulverizing plant, said pulverizing plant being adapted to be operated by expanding hot gases, fuel conduits connecting said pulverizing plant and said heat consuming means and adapted to conduct the coal pulverized in said pulverizing plant from said pulverizing plant to said heat consuming means and gas conduits also connecting said pulverizing plant and said heat consuming means and adapted to conduct the hot gases after having expanded and given up part of their heat content in said pulverizing plant from said pulverizing plant to said heat consuming means for giving up further heat in said heat consuming means.

3. Combustion plant comprising a pulverizing plant including a coal pulverizer adapted to be operated by expanding hot gases and heat consuming means adapted to be heated by the coal pulverized in said pulverizer, a combustion chamber associated with said pulverizing plant and producing the hot gases for operating said pulverizer, said combustion chamber being adapted to receive powdered coal as fuel directly from said pulverizer, air compressing means and conduits connecting said compressing means with said combustion chamber for supplying combustion air to said chamber, conduits connecting said pulverizer and said heat consuming means for conducting the hot gases after they have expanded and given up part of their heat content for operating said pulverizer from said pulverizer to said heat consuming means for giving up further heat in said heat consuming means.

4. Combustion plant comprising a pulverizing plant including a coal pulverizer, adapted to be operated by expanding hot gases and heat consuming means adapted to be heated by the coal pulverized in said pulverizer, a combustion chamber adjacent to and associated with said pulverizer and producing the hot gases for operating said pulverizer, said combustion chamber being adapted to receive powdered coal as fuel directly from from said pulverizer, air compressing means and conduits connecting said compressing means with said combustion chamber for supplying combustion air to said chamber, conduits connecting said pulverizer and said heat consuming means for conducting the hot gases after they have expanded and given up part of their heat content for operating said pulverizer from said pulverizer to said heat consuming means for giving up further heat in said heat consuming means.

5. Combustion plant comprising a pulverizing plant including a coal pulverizer, adapted to be operated by expanding hot gases and heat consuming means adapted to be heated by the coal pulverized in said pulverizer, a combustion chamber adjacent to and associated with said pulverizer and producing the hot gases for operating said pulverizer, said combustion chamber being adapted to receive powdered coal as fuel directly from said pulverizer, air compressing means and conduits connecting said compressing means with said combustion chamber for supplying combustion air to said chamber, conduits connecting said pulverizer and said heat consuming means for conducting the hot gases after they have expanded and given up part of their heat content for operating said pulverizer from said pulverizer to said heat consuming means for giving up further heat in said heat consuming means, said heat consuming means comprising a power generator, said compressing means being operated by power produced in said power generator.

6. Combustion plant comprising a heat consumer, a coal pulverizer for producing powdered coal for firing said heat consumer, an air compressor for supplying compressed air for operating said pulverizer, a gas turbine operatively connected with and operating said compressor, and an exhaust gas conduit connecting said gas turbine and said heat consumer for supplying exhaust gases to said heat consumer.

7. Combustion plant comprising a heat consumer, a coal pulverizer for producing powdered coal for firing said heat consumer, air supply means including an air compressor for supplying compressed air for opearting said pulverizer, a gas turbine operatively connected with and operating said compressor, and an exhaust gas conduit connecting said gas turbine and said air supply means for heating the compressed air by the heat contained in the exhaust gases.

8. Combustion plant comprising a coal pulverizer, a heat consumer, means for producing hot and highly compressed gases, said pulverizer having a crushing plate and an expansion nozzle gas conductively connected with said means for producing hot and highly compressed gases and adapted to expand and accelerate the gases, and adapted to blow a gas jet through the coals within said pulverizer whereby the gas jet seizes part of the coals and throws them against said crushing plate whereby the coal is divided into small particles, powdered coal conduits connecting said pulverizer and said heat consumer for conducting the pulverized coal from said pulverizer to said heat consumer, and gas conduits connecting said pulverizer and said heat consumer for conducting gases from said pulverizer to said heat consumer for giving up heat to said consumer.

9. Combustion plant comprising a pressure fired combustion chamber adapted to burn powdered coal and a steam boiler associated with and heated by the combustion gases produced in said combustion chamber, a pneumatic coal pulverizer adapted to be operated by compressed air, a combustion air compressor air conductively connected with and supplying combustion air to said combustion chamber, a secondary air compressor air conductively connected with the discharge side of said combustion air compressor and being charged with air from said combustion air compressor and air conductively connected with said pulverizer and supplying operating air to said pulverizer, a gas turbine operatively connected with and operating said combustion air compressor, said gas turbine being gas conductively connected with said combustion chamber and receiving operating gas therefrom, and a conduit connecting said pulverizer and said combustion chamber for conducting powdered coal from said pulverizer to said combustion chamber.

10. Combustion plant comprising a pressure fired combustion chamber adapted to burn powdered coal and a steam boiler associated with and heated by the combustion gases produced in said combustion chamber, a pneumatic coal pulverizer adapted to be operated by compressed air, a combustion air compressor, air conductively connected with and supplying combustion air to said combustion chamber, a secondary air compressor air conductively connected with the discharge side of said combustion air compressor and being charged with air from said combustion air compressor and air conductively connected with said pulverizer and supplying operating air to said pulverizer, a gas turbine operatively connected with and operating said combustion air compressor, said gas turbine being gas conductively connected with said combustion chamber and receiving operating gas therefrom, and a conduit connecting said pulverizer and said combustion chamber for conducting powdered coal from said pulverizer to said combustion chamber and a gas conduit connecting the exhaust side of said gas turbine with said steam boiler for supplying exhaust gas for additionally heating said boiler.

11. A combustion plant comprising high pressure combustion means producing hot high power combustion gases, a coal pulverizer gas conductingly connected with said combustion means and adapted to be operated by part of the power contained in said high power combustion gases and a heat consumer gas conductingly connected with said pulverizer and adapted to absorb another part of the heat contained in said hot gases after they have passed through and given up part of their heat in said pulverizer.

12. A combustion plant comprising high pressure combustion means producing hot high power combustion gases, a coal pulverizer gas conductingly connected with said combustion means and adapted to be operated by part of the power contained in said high power combustion gases and a heat consumer gas conductingly connected with said pulverizer and adapted to absorb another part of the heat contained in said hot gases after they have passed through and given up part of their heat in said pulverizer, said combustion means being fired by coal pulverized in said pulverizer.

13. A plant comprising a heat consumer, combustion means for producing an operating gas of high heat content, a coal pulverizer gas conductingly connected with said combustion means and adapted to be operated by expansion of said operating gas, said heat consumer being gas conductingly connected with said pulverizer and adapted to receive the heat from said operating gas which is not used for operating said pulverizer.

14. A plant comprising a coal pulverizer adapted to be operated by expanding hot gases, heat consuming means pulverized coal conductingly connected with said pulverizer and adapted to be heated by the coal pulverized in said pulverizer, a combustion chamber gas conductingly connected with and adapted to produce hot gases for operating said pulverizer, said combustion chamber being connected with and adapted to receive powdered coal as fuel from said pulverizer, air compressing means and conduits connecting said compressing means with said combustion chamber for supplying combustion air to said chamber, said heat consuming means comprising a power generator said compressing means being operatively connected with and adapted to be operated by power produced in said generator.

15. A coal pulverizing plant comprising high pressure combustion means producing hot high power combustion gases, a pulverizer adapted to be operated by high pressure gases and a gas compressor gas conductingly connected with and supplying operating gas to said pulverizer, a gas engine gas conductingly connected with said combustion means and adapted to be operated by the high power combustion gases produced in said combustion means, said gas engine being connected to and driving said compressor.

16. A coal pulverizing plant comprising high pressure combustion means producing hot high power combustion gases, a pulverizer adapted to be operated by high pressure gases, a gas compressor gas conductingly connected with and supplying operating gas to said pulverizer, a gas engine gas conductingly connected with said combustion means and adapted to be operated by the high power combustion gases produced in said combustion means, said gas engine being connected to and driving said compressor, said means being heated by coal pulverized in said pulverizer.

17. A coal pulverizing plant comprising high pressure combustion means producing hot high power combustion gases, a pulverizer adapted to be operated by high pressure gases and a gas compressor gas conductively connected with and supplying operating gas to said pulverizer, a gas engine gas conductingly connected with said combustion means and adapted to be operated by part of the power of said combustion gases, said gas turbine being connected to and driving said compressor, and a heat consumer gas conductingly connected with the exhaust side of said gas engine and adapted to absorb another part of the heat power of said combustion gases.

18. A coal pulverizing plant comprising a pressure fired combustion chamber producing hot high power gases, a coal pulverizer adapted to be operated by hot air, an air compressor, an air conduit connecting said compressor with and supplying operating air to said pulverizer, a gas engine gas conductingly connected with said combustion chamber and adapted to be operated by part of the power contained in said high power gases and connected with and driving said air compressor and an air heater in said air conduit for heating the operating air before it enters said pulverizer, said heater being gas conductingly connected with the exhaust side of said gas engine and adapted to be operated by part of the heat contained in said hot gases.

19. A coal pulverizing plant comprising a pressure fired combustion chamber producing hot high power gases, a coal pulverizer adapted to be operated by hot air, an air compressor, an air conduit connecting said compressor with and supplying operating air to said pulverizer, a gas engine gas conductingly connected with said combustion chamber and adapted to be operated by part of the power contained in said high power gases and connected with and driving said compressor, an air heater in said air conduit for heating the operating air before it enters said pulverizer, said heater being gas conductingly connected with said combustion chamber and adapted to be heated by heat contained in said hot gases, and a heat consumer gas conductingly connected with said combustion chamber and adapted to absorb heat contained in said hot gases.

20. A plant comprising a pulverized coal fired heat consumer, a coal pulverizer adapted to be operated by high pressure gases, a combustion air-compressor air conductingly connected with and supplying combustion air to said heat consumer, another air-compressor air conductingly connected with the discharge side of said first mentioned combustion air compressor and being charged with air therefrom, an air conduit connecting said other air compressor and said pulverizer for supplying operating air thereto, heating means connected with said air conduit for heating the operating air before it enters said pulverizer, a gas engine operatively connected with and operating said combustion air compressor, said gas engine being gas conductingly connected with said heat consumer and receiving operating gas therefrom, and a conduit connecting said pulverizer and said heat consumer for conducting pulverized coal from said pulverizer to said consumer.

21. A plant comprising a pulverized coal fired heat consumer, a coal pulverizer adapted to be operated by high pressure gases, a combustion air compressor air conductingly connected with and supplying combustion air to said heat consumer, another air compressor air conductingly connected with the discharge side of said first mentioned combustion air compressor and being charged with air therefrom, an air conduit connecting said other air compressor and said pulverizer for supplying operating air thereto, a gas engine operatively connected with and operating said combustion air compressor, said gas engine being gas conductingly connected with said heat consumer and receiving operating gas therefrom, and a conduit connecting said pulverizer and said heat consumer for conducting pulverized coal from said pulverizer to said consumer.

22. A plant comprising a pulverized coal fired heat consumer, a coal pulverizer adapted to be operated by high pressure gases, an air compressor air conductingly connected with and supplying high pressure operating air to said pulverizer, a gas engine operatively connected with and operating said air compressor, said gas engine being gas conductingly connected with said heat consumer and receiving operating gas therefrom, and a conduit connecting said pulverizer and said heat consumer for conducting pulverized coal from said pulverizer to said consumer.

23. A combustion plant comprising a coal pulverizer, a heat consumer, means for producing hot highly compressed gases, said means comprising fuel supply means and air supply means, said air supply means comprising heating means which are gas conductingly connected with and adapted to be heated by gases emerging from said heat consumer, said pulverizer having a crushing plate and an expansion nozzle gas conductingly connected with said means for producing hot and highly compressed gases and adapted to expand and accelerate the gases, and adapted to blow a gas jet through the coals within said pulverizer, whereby the gas jet seizes part of the coals and throws them against said crushing plate, whereby the coal is divided into small particles, conduits connecting said pulverizer and said heat consumer for conducting the pulverized coal and gases from said pulverizer to said consumer for firing and heating said consumer.

WALTER GUSTAV NOACK.